(No Model.)
R. W. IVY.
CANOPY FRAME FOR MOSQUITO NETS.
No. 598,098. Patented Feb. 1, 1898.
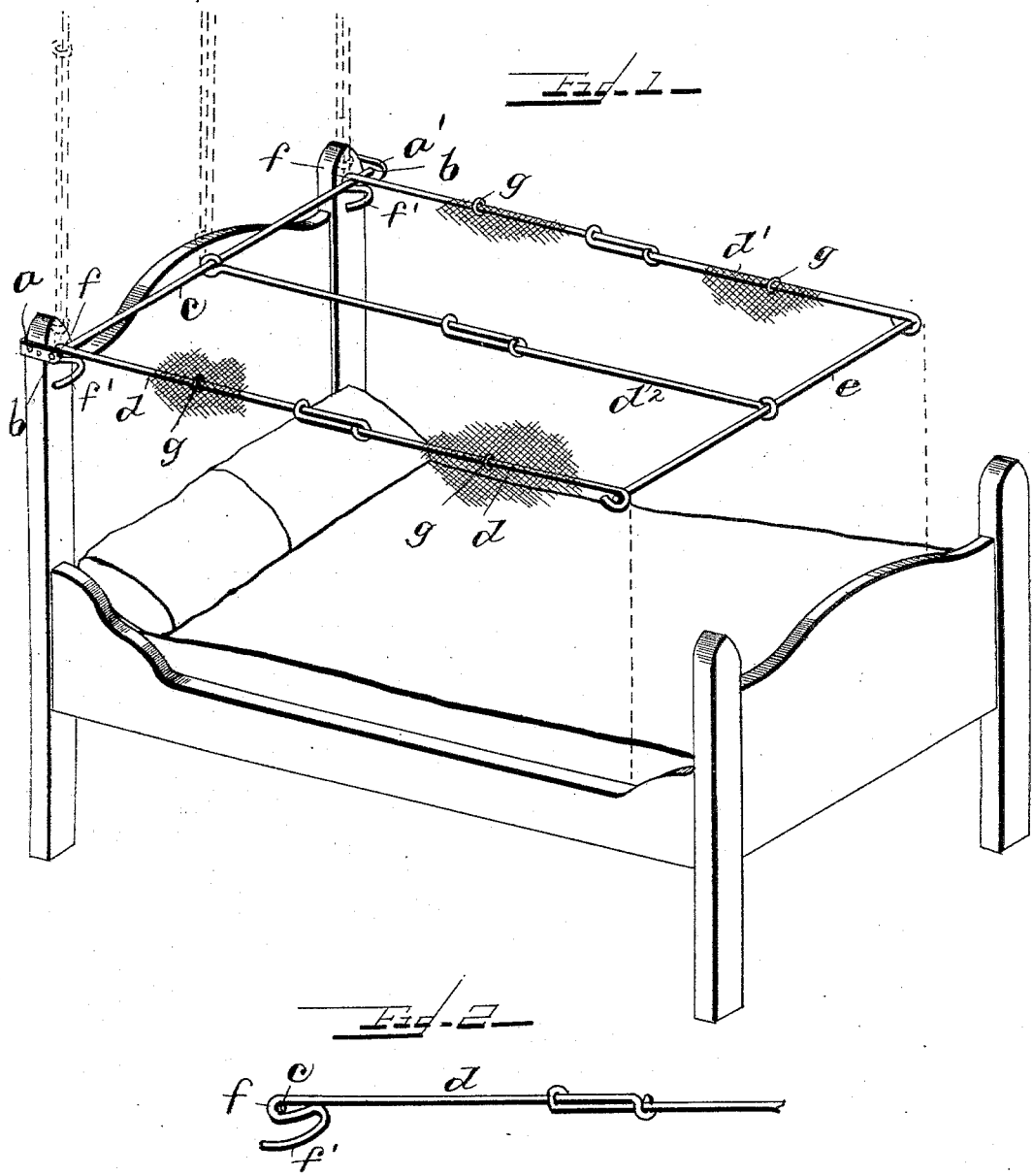
Witnesses
G. E. Shunn
J. D. Kingsbury
Inventor
Robert W. Ivy
By Wm H. Bates
Attorney

UNITED STATES PATENT OFFICE.

ROBERT W. IVY, OF NEW LONDON, NORTH CAROLINA.

CANOPY-FRAME FOR MOSQUITO-NETS.

SPECIFICATION forming part of Letters Patent No. 598,098, dated February 1, 1898.

Application filed August 14, 1897. Serial No. 648,245. (No model.)

*To all whom it may concern:*

Be it known that I, ROBERT W. IVY, a citizen of the United States, residing at New London, in the county of Stanley and State of North Carolina, have invented certain new and useful Improvements in Canopy-Frames for Mosquito and Fly Nets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to improvements in canopy-frames for sustaining and holding mosquito and fly nets over and about a bed; and the object is to provide a frame for the purposes named which is simple and cheap in construction, easily applied, and readily disposed and arranged for the use intended.

I have fully and clearly illustrated the improvements in the accompanying drawings, wherein—

Figure 1 is a perspective view of the frame as connected to a bed and wherein the upright position is shown in dotted lines. Fig. 2 is a detail view of the supporting or bracket end of one of the side bars.

$a\ a'$ designate brackets secured to the opposite posts or sides of the headboard of the bed at such height as may be required to bring the canopy-frame to the desired position over the bed when supported in horizontal position. The side pieces or ears of these brackets or bearing-pieces project forward from the face of the post or headboard and are formed with openings in the projecting parts, constituting bearings $b\ b$ for the supporting journal-bar $c$ of the frame, the ends of which are disposed in the bearings, substantially as shown in the drawings.

The frame is composed of parallel side bars $d\ d'$, each made in two pieces slidingly and extensibly connected together by means of eyes in the inner ends surrounding the part to which it is connected. By this sliding connection the frame may be shortened or elongated to suit the length of the bed to which it is connected. A middle extensible bar $d^2$ is provided. These bars $d\ d'\ d^2$ have their outer ends secured to an end bar $e$, and the middle bar $d^2$ has its inner end secured to the journal-bar $c$ in any suitable manner. The inner ends of the side bars $d\ d'$, on which they are journaled and turn, are of particular construction. Referring to Fig. 2 of the drawings, it will be seen that the end of each bar is bent forward and onto the main bar, forming an eye $f$, forming a bearing which journals on the journal-bar $c$. The turned-up part of the bars is then turned or bent back and downward, as at $f'$, toward the eye end of the bar to form a stop or rest piece adapted and arranged to lodge against the surface of the bed-post or headboard to sustain the whole frame in horizontal position over the bed. On the side bars are arranged two or more rings $g$, which slide loosely thereon and which are attached to the fabric of the netting by any proper means and serve to permit the netting to be slid upon and be adjusted to the length of the side bars or frame.

To mount and use the frame, the journal-bar is disposed in its bearings fixed on the headboard or posts of the head, and the frame then adjusted to the length of the bed, when the netting, if not already on the frame, may be secured thereon so as to envelop or surround the bed, when all that is required is to leave the frame down in horizontal position. When not desired for use or in making up the bed, the frame is turned to vertical position, where it stands until again brought down.

Having thus described my invention, what I claim as new, and desire to secure by Letters Patent, is—

In a bed-canopy, the brackets secured to the headboard of the bed upon opposite sides thereof, a journal-bar having its ends journaled therein, in combination with a rectangular frame comprising central and outer parallel sectional bars arranged to slide within each other, each bar having eyes formed upon its outer or meeting end, and having netting-rings thereon; the ends of the two outer bars of one section engaging the journal-bar and bent back upon themselves to form substantially S-shaped stops all arranged and operated as herein described.

In testimony whereof I affix my signature in presence of two witnesses.

ROBERT W. IVY.

Witnesses:
G. C. HEGLAR,
W. M. IVY.